United States Patent

Mizuta

[11] Patent Number: 5,909,596
[45] Date of Patent: Jun. 1, 1999

[54] SELF-CONFIGURING PC CARD WITH CONNECTOR CAPABLE OF USING THE PIN CONFIGURATION OF AN ATTACHED PERIPHERAL TO IDENTIFY THE PERIPHERAL

[75] Inventor: Masaharu Mizuta, Tokyo, Japan

[73] Assignee: Mitsubishi Denki Kabushiki Kaisha, Tokyo, Japan

[21] Appl. No.: 08/678,330

[22] Filed: Jul. 11, 1996

[30] Foreign Application Priority Data

Dec. 27, 1995 [JP] Japan .................................. 7-340684

[51] Int. Cl.⁶ .................................................. G06F 13/12
[52] U.S. Cl. .......................... 395/883; 395/858; 395/884; 395/834; 395/835; 395/283; 395/284
[58] Field of Search ..................... 395/651, 280, 395/281, 282, 283, 284, 306, 309, 821, 828, 830, 834, 835, 858, 883, 884

[56] References Cited

U.S. PATENT DOCUMENTS

| | | |
|---|---|---|
| 4,500,933 | 2/1985 | Chan ............................................ 360/69 |
| 4,972,470 | 11/1990 | Farago ........................................ 380/3 |
| 5,258,655 | 11/1993 | May et al. ................................ 307/139 |
| 5,501,608 | 3/1996 | Scheer et al. ............................ 439/218 |
| 5,506,868 | 4/1996 | Cox et al. ................................. 375/222 |
| 5,537,558 | 7/1996 | Fletcher et al. .......................... 710/129 |
| 5,630,170 | 5/1997 | Koizumi et al. .......................... 710/14 |
| 5,666,491 | 9/1997 | Harris, Jr. et al. ........................ 710/62 |

*Primary Examiner*—Thomas C. Lee
*Assistant Examiner*—Douglas Rupert

[57] ABSTRACT

A multiple function PC card that is an input/output card providing two or more functions not used simultaneously including a PC connector for connecting the multiple function PC card to a computer, a device connector for connecting external devices accessing the functions of the card, an execution device for executing the functions, and a discriminator for identifying which functions correspond to the connected devices, wherein the discriminator outputs the function identification results, and the execution device operates and executes the corresponding function exclusively of other execution devices.

7 Claims, 4 Drawing Sheets

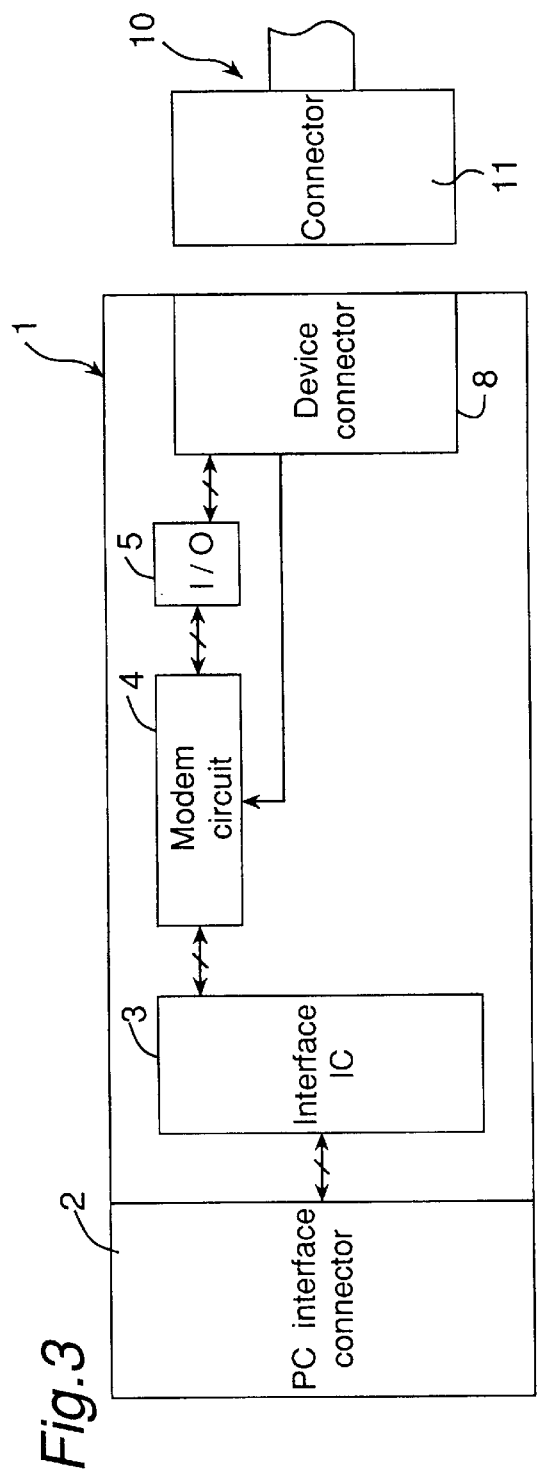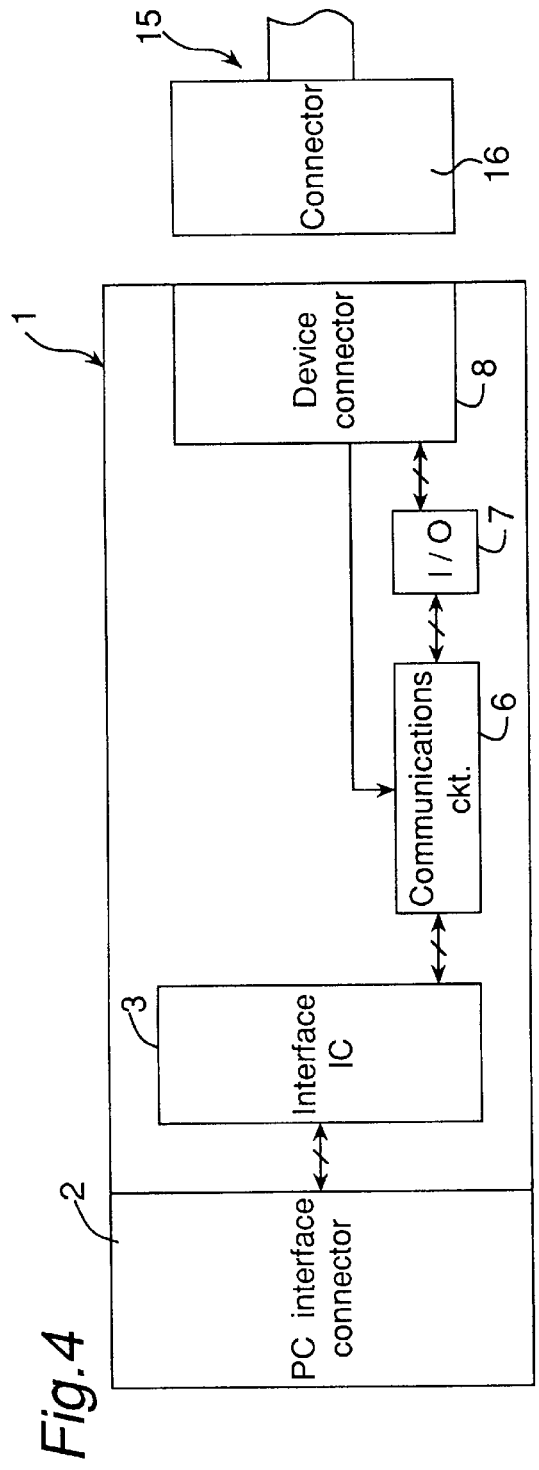

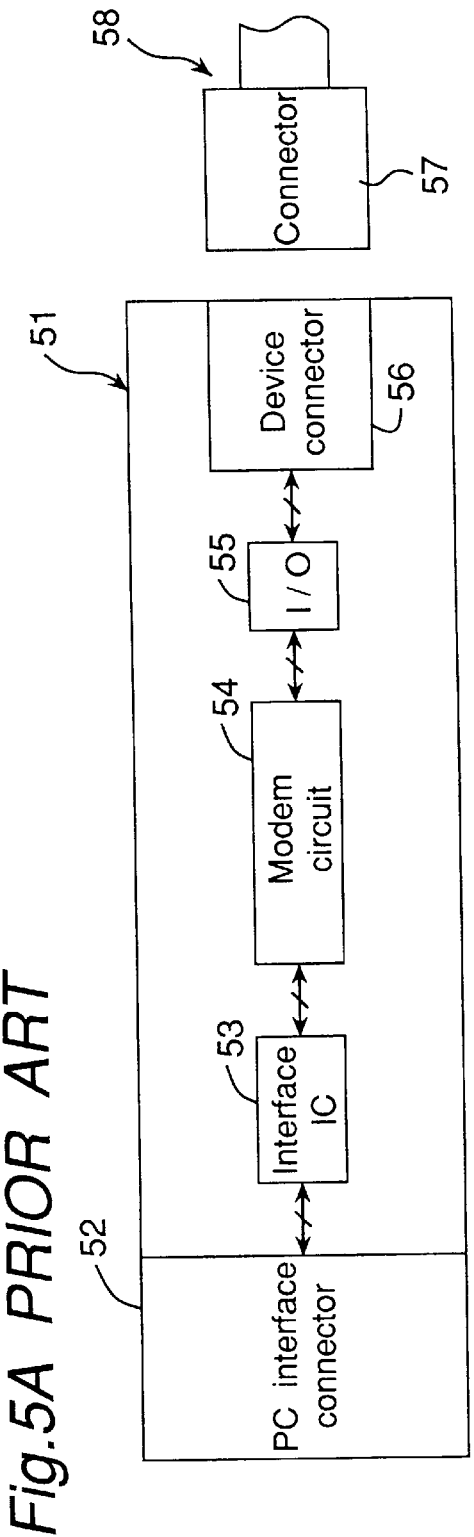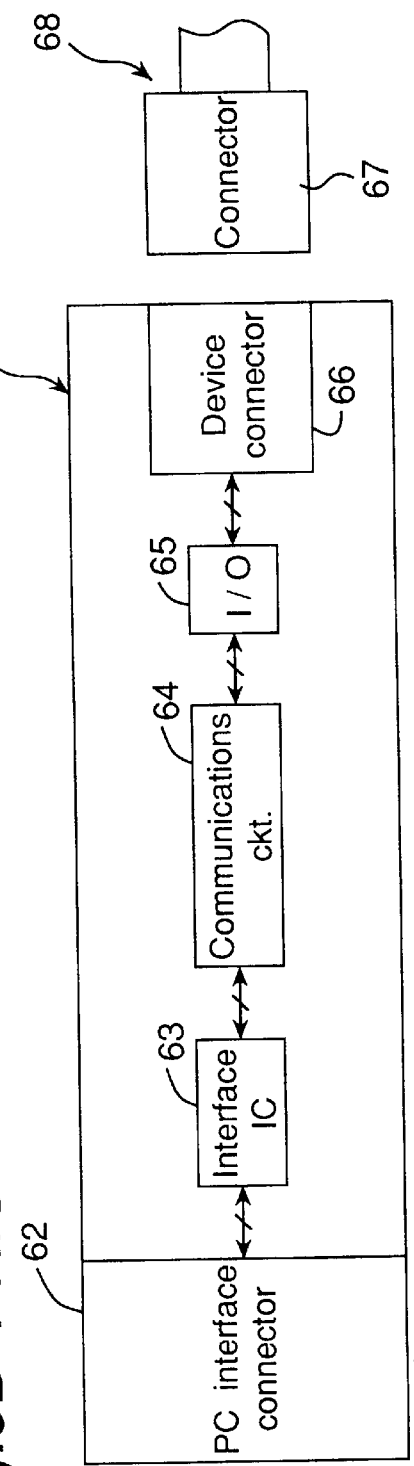
Fig.5A PRIOR ART
Fig.5B PRIOR ART

SELF-CONFIGURING PC CARD WITH CONNECTOR CAPABLE OF USING THE PIN CONFIGURATION OF AN ATTACHED PERIPHERAL TO IDENTIFY THE PERIPHERAL

BACKGROUND OF THE INVENTION

1. Field of the Invention

The present invention relates to an input/output card of a PC card conforming to the PCMCIA standard, and relates particularly to a multiple function PC card comprising two or more functions of which none are used simultaneously.

2. Description of the Prior Art

FIGS. 5A and 5B are block diagrams of a conventional PC cards conforming to the PCMCIA standard, FIG. 5A showing a conventional modem card, and FIG. 5B showing a conventional communications card used with a portable telephone.

Referring to FIG. 5A, a modem card 51 comprises a PC interface connector 52 conforming to the PCMCIA standard for connecting the modem card 51 to a personal computer or other computing device; an interface IC 53 conforming to the PCMCIA standard; circuitry 54 executing the various functions of the modem card; an input/output (I/O) circuit block 55 providing the interface between the circuitry 54 and the external device connected to the modem card 51; and a device connector 56 for connecting an external device to the modem card 51, and provided on the modem card 51 at a position relative to the PC interface connector 52. One connector 57 of the connector cable 58 connecting the modem card 51 with the external device is connected to the device connector 56, and the other cable connector, which is typically a modular jack, is connected to the external device, typically the telephone network interface (line) connector for a modem card 51 such as this.

The communications card 61 shown in FIG. 5B similarly comprises a PC interface connector 62 conforming to the PCMCIA standard for connecting the communications card 61 to a personal computer or other computing device; an interface IC 63 conforming to the PCMCIA standard; circuitry 64 executing the various functions of the communications card; an input/output (I/O) circuit block 65 providing the interface between the circuitry 64 and the external device connected to the communications card 61; and a device connector 66 for connecting an external device to the communications card 61, and provided on the communications card 61 at a position relative to the PC interface connector 62. One connector 67 of the connector cable 68 connecting the modem card 61 with the external device is connected to the device connector 66, and the other cable connector is connected to the external device, a portable telephone in this example.

Single PC card such as these thus typically provides only a single function. As the degree of integration achievable in integrated circuits has risen, however, both the number and size of the components required to achieve a single function have decreased, creating empty space in the PC card and making it possible to incorporate two different functions in a single PC card. This has led to the development of multiple function PC cards combining two different functions, e.g., LAN card and modem card functions or modem card and SCSI card functions, in a single PC card. By thus providing plural functions and capabilities in a single PC card, the unit cost per function is decreased. In addition, personal computers and personal digital assistants (PDA) commonly have only one or two PC card slots, and combining plural functions in a single card eliminates the need to carry plural cards to achieve the same functionality.

Conventional multiple function PC cards combining the functions of two or more single function cards are designed assuming the simultaneous use of two functions, and provide discrete device connectors for each function on the PC card. Because it is also possible to switch immediately between functions, the control circuitry is complex, making it difficult to further reduce cost. Combining the functions of a modem card and a communications card as described above into a single PC card is extremely efficient and convenient when accessing a data network from a remote location (e.g., when away from one's office). On the other hand, because these two functions cannot be used simultaneously over a single telephone connection, the complex circuitry enabling simultaneous use of two functions in conventional multiple function PC cards is extremely wasteful, resulting in a cost that is higher than necessary.

SUMMARY OF THE INVENTION

An object of the present invention is therefore to provide a multiple function PC card capable of accessing different kinds of external devices with a single connection.

Another object of the present invention is to provide a multiple function PC card capable of automatically selecting and executing a function suitable for an external device connected thereto.

A further object of the present invention is to reduce the cost of a multiple function PC card.

To achieve these objects, according to the present invention, there is provided a multiple function PC card that is an input/output card providing a plurality of functions not used simultaneously comprising a PC connection means for connecting the multiple function PC card to a computer, a device connection means comprising a first and second connectors connectable to each other, the first connector being built in the multiple function PC card and the second connector being adapted to each of plural kinds of external devices to be selectively connected to the multiple function PC for accessing one of the plurality of functions, a plurality of execution means for executing the plurality of functions, respectively, and discrimination means for identifying an external device having been connected to the multiple function PC card through the device connection means, thereby identifying a function corresponding to the external device connected among the plurality of functions, wherein the discrimination means designates one of the plurality of execution means in response to the function identified one the one execution means, when designated, operates exclusively of the other execution means.

More specifically, the second connector has a unique connector pin arrangement corresponding to each kind of the external device and the first connector has a connector pin arrangement capable of matching all connector pin arrangements of the second connector. It is therefore not necessary to provide on the multiple function PC card plural dedicated connectors used by the individual functions of the PC card, and a single device connector can be shared for plural functions.

In addition, the discrimination means discriminates the function based on the connector pin arrangement of the second connector connected to the first connector. More specifically, the first connector comprises output pins for outputting each of the identification signals, and input pins for inputting the identification signal selected by the second connector, and the second connector selects the identification signal corresponding to the function for which the connected device is used by connecting the output terminals and input terminals corresponding to the same function. The discrimination means is thus able to identify the function corresponding to the connector cable in use whenever one of the connector cables is connected to the device connector.

It is therefore possible, while retaining a simple construction and circuit configuration, to automatically and exclusively select a particular function of the multiple function PC card by simply connecting to the device connector the connector of the connector cable used to connect the external device used for a specific function. The circuitry of the multiple function PC card can thus be simplified, thus reducing the cost and improving the portability of a multiple function PC card providing plural functions that are not used simultaneously.

Furthermore, in a multiple function PC card comprising only two functions that are not used simultaneously, a binary signal having only two signal levels, high and low, can be used as the identification signal. In addition, by using the power supply voltage of the PC card as the HIGH signal level, and the ground level of the PC card as the LOW signal level, it is not necessary to separately provide a circuit for generating the identification signal, and the cost of the multiple function PC card can therefore be further reduced.

BRIEF DESCRIPTION OF THE DRAWINGS

The present invention will become more fully understood from the detailed description given below and the accompanying diagrams wherein:

FIG. 3 is a block diagram showing the operating circuit components when the modem card function of the PC card shown in FIG. 1 is selected;

FIG. 4 is a block diagram showing the operating circuit components when the communications card function of the PC card shown in FIG. 1 is selected; and FIGS. 5A and 5B are block diagrams of PCMCIA standard PC cards according to the prior art.

DESCRIPTION OF PREFERRED EMBODIMENTS

The preferred embodiments of the present invention are described below with reference to the accompanying figures.

EMBODIMENT 1

Figure 1:
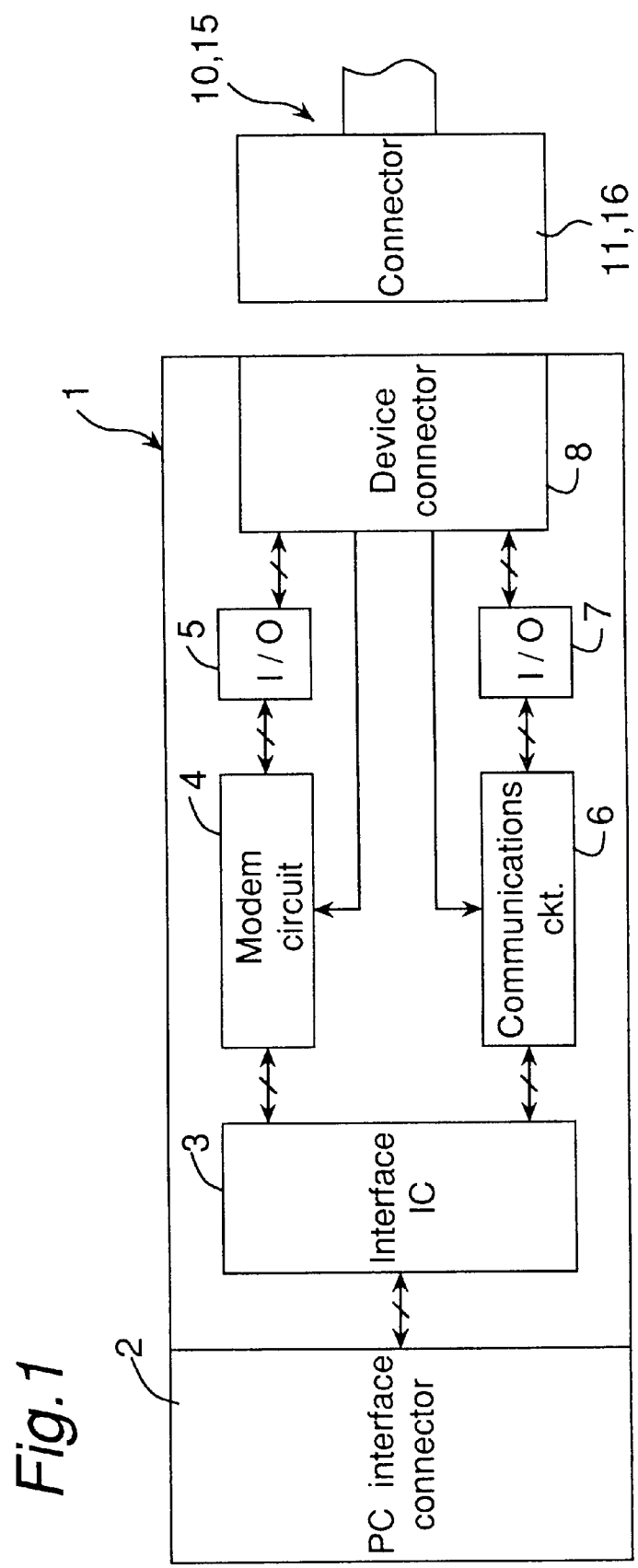
FIG. 1 is a block diagram of an example of a multiple function PC card conforming to the PCMCIA standard according to the preferred embodiment of the present invention.

FIG. 1 is a block diagram of a multiple function PC card conforming to the PCMCIA standard according to a first embodiment of the present invention. Note that the multiple function PC card shown in FIG. 1 is described as a PC card providing the functions of a modem card and the functions of a communications card for a portable telephone. When this multiple function PC card is used in a compact personal computer or PDA and a telephone network interface connection is available, such as through a public telephone, the modem card functions are used. When a direct telephone connection is not available and a portable telephone can be used, the communications card for portable telephone connections is used. As a result, the modem card functions and the portable telephone communications card functions are not used simultaneously, and are used exclusive of the other.

Referring to FIG. 1, the multiple function PC card 1 includes a PC interface connector 2 conforming to the PCMCIA standard for connecting the card to a personal computer or other computing device; a PCMCIA-standard interface IC 3; a modem circuit 4 providing the functions of a typical modem card; an input/output (I/O) circuit block 5 providing the interface between the modem circuit 4 and the external device connected to the multiple function PC card 1; a communications circuit 6 providing the functions of a portable telephone communications card; an I/O circuit block 7 providing the interface between the communications circuit 6 and the corresponding external device connected to the multiple function PC card 1; and a device connector 8 provided relative to the PC interface connector 2 and used to connect an external device to the multiple function PC card 1.

One connector 11 of the modem interface cable 10 used to connect the multiple function PC card 1 to a telephone line, or one connector 16 of the communications connector cable 15 used to connect the multiple function PC card 1 to the non-telephone interface connector of the portable telephone, is connected to the device connector 8. Connectors 11 and 16 are identically shaped, and comprise the connector pins required for the function of the corresponding external device. For example, if the modem interface cable 10 uses two wires and the communications connector cable 15 uses 16 wires, the connector 11 for the modem interface cable 10 comprises two pins, and the connector 16 for the communications connector cable 15 comprises 16 pins. The device connector 8 in this example thus has a minimum 18 connector pins. It should noted that the modem interface cable 10 and communications connector cable 15 are thus described in the present embodiment as having two and sixteen wires and pins respectively, but the present invention shall not be so limited.

The other connector of the modem interface cable 10 is a modular jack, and the modular jack and connector 11 of the modem interface cable 10 are connected by a two wire cable. The other connector of the communications connector cable 15 comprises 16 pins connecting with the non-telephone interface terminal of the portable telephone, and this connector and the connector 16 are similarly connected by a sixteen wire cable.

The device connector 8 also comprises three additional connector pins, one of which is shared by the modem circuit 4 and the communications circuit 6. Of the remaining two pins, one is connected to the power supply from the computer to which the multiple function PC card 1 is connected, and the other is connected to the ground through said computer. These three additional pins are used to determine whether the connector connected to the device connector 8 is the modem interface cable connector 11, or the communications connector cable connector 16.

The device connector 8 thus comprises 21 connector pins, and each of the connectors 11 and 16 connected thereto has the same 21-pin configuration enabling connection to the device connector 8. Connectors 11 and 16 are provided with only those pins needed to identify the connector (device) connected to the device connector 8, and the function performed by the corresponding external device. If unnecessary pins are provided in the connector 11 or 16, those pins are open. The device connector 8 is thus compatible with and can be individually connected to both connectors 11 and 16.

It should be further noted that, in one embodiment, the PC interface connector 2 functions as the PC connecting means of the Claims; the modem circuit 4 and communications circuit 6 function as the execution means; the device connector 8, modem interface cable 10, and communications connector cable 15 function as the device connecting means; and the modem interface cable connector 11 and the communications connector cable connector 16 function as the discrimination means.

Figure 2A:
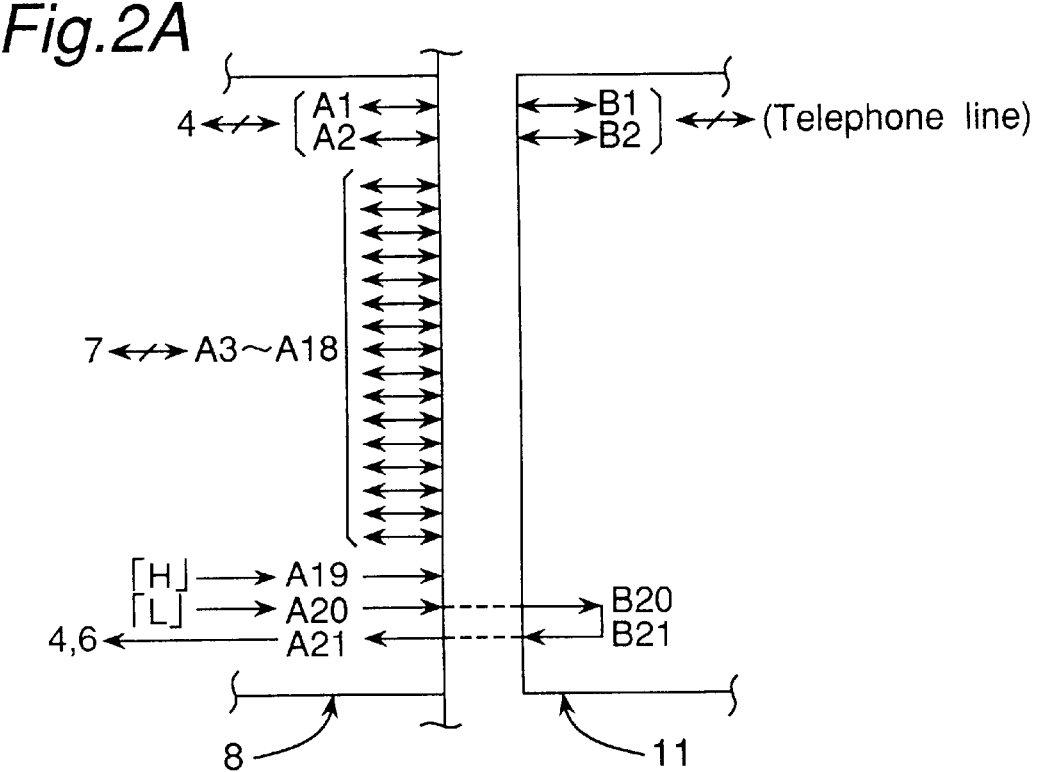
FIGS. 2A and 2B are diagrams showing the pin arrangements of the device connector 8, connector 11, and connector 16 shown in FIG. 1.
Figure 2B:
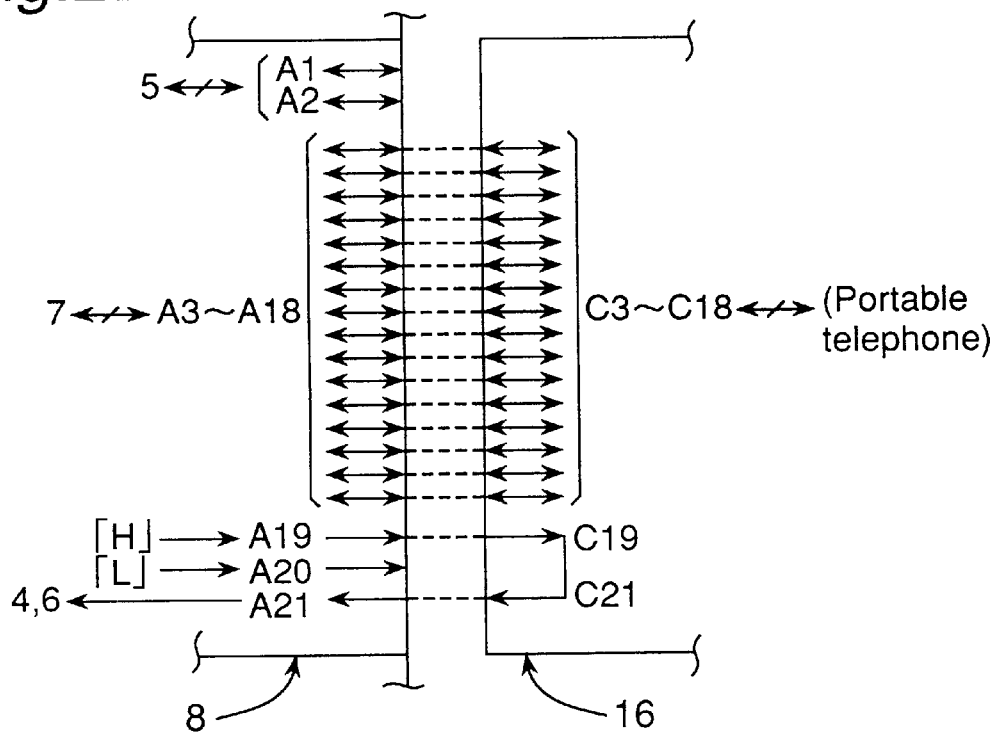

FIGS. 2A and 2B show the arrangement of the connector pins in the device connector 8 and connectors 11 and 16. FIG. 2A shows the pin connections when connector 11 is connected to the device connector 8, and FIG. 2B shows the pin connections when connector 16 is connected to the device connector 8. The structure for identifying which connector is connected to the device connector 8 is described next with reference to FIG. 2.

As shown in FIGS. 2A and 2B, the connector pins of the device connector 8 are arrayed in a single series. The two pins A1 and A2 at one end of this series are used to connect the multiple function PC card 1 to a telephone line via the modem interface cable 10. The three pins A19, A20, and A21 at the other end of the series are used to identify the connector (device) connected to the device connector 8. The remaining pins A3–A18 between pins A2 and A19 are used to connect the multiple function PC card 1 to the non-telephone interface connector of a portable telephone via the communications connector cable 15.

Pins A1 and A2 are connected to the modem circuit 4 through the corresponding I/O circuit block 5, and pins A3–A18 are connected to the communications circuit 6 through the corresponding I/O circuit block 7. Pin A19 is connected, for example, to the +5-V power supply supplied from the computer to which the multiple function PC card 1 is connected, and is therefore used to supply a HIGH signal. Pin A20 is grounded (0 V), and is used to supply a LOW signal. Pin A21 is connected to both the modem circuit 4 and the communications circuit 6.

As shown in FIG. 2A, the connector 11 for the modem interface cable 10 comprises pins B1 and B2 corresponding to pins A1 and A2 of the device connector 8, and pins B20 and B21 corresponding to pins A20 and A21 of the device connector 8. When this connector 11 is connected to the device connector 8, pin B1 is therefore connected to pin A1, pin B2 to pin A2, pin B20 to pin A20, and pin B21 to pin A21. Pins B20 and B21 of this connector 11 are electrically connected inside the connector 11. As a result, connecting connector 11 to the device connector 8 effectively connects pin A20 to pin A21 of the device connector 8, and thus supplies a LOW signal to the modem circuit 4 and the communications circuit 6.

The modem circuit 4 operates when a LOW signal is supplied from pin A21, and the communications circuit 6 stops operating when the LOW signal is supplied from pin A21. The communications circuit 6 thus ignores any signals input at this time from the interface IC 3 and the I/O circuit block 7, and terminates all signal output. The modem circuit 4 thus operates exclusive of the communications circuit 6, and transmits and receives signals to and from the telephone line through the I/O circuit block 5, pins A1 and A2, and the modem interface cable 10. The multiple function PC card 1 thus functions as a modem card comprising a PC interface connector 2, interface IC 3, modem circuit 4, I/O circuit block 5, and device connector 8, as shown in FIG. 3. Note that in this example pins B3–B19 corresponding to pins A3–A19 of the device connector 8 are not provided in the modem interface cable connector 11, and if they were provided, are open.

As shown in FIG. 2B, the connector 16 for the communications connector cable 15 comprises pins C3–C18 corresponding to pins A3–A18 of the device connector 8, and pins C19 and C21 corresponding to pins A19 and A21 of the device connector 8. When this connector 16 is connected to the device connector 8, pins C3–C18 are therefore connected to pins A3–A18, pin C19 to pin A19, and pin C21 to pin A21. Pins C19 and C21 of this connector 16 are similarly electrically connected inside the connector 16. As a result, connecting connector 16 to the device connector 8 effectively connects pin A20 to pin A21 of the device connector 8, and thus supplies a HIGH signal to the modem circuit 4 and the communications circuit 6.

The communications circuit 6 operates when a HIGH signal is supplied from pin A21, and the modem circuit 4 stops operating when a HIGH signal is supplied from pin A21. The modem circuit 4 thus ignores any signals input at this time from the interface IC 3 and the I/O circuit block 5, and terminates all signal output. The communications circuit 6 thus operates exclusive of the modem circuit 4, and exchanges signals with the portable telephone through the I/O circuit block 7, pins A3–A18, and the communications connector cable 15. The multiple function PC card 1 thus functions as a communications card comprising a PC interface connector 2, interface IC 3, communications circuit 6, I/O circuit block 7, and device connector 8, as shown in FIG. 4. Note that in this example pins C1 and C2 corresponding to pins A1 and A2, and pin C20 corresponding to pin A20, of the device connector 8 are not provided in the communications connector cable connector 16, and if they were provided are open.

By means of a multiple function PC card according to the first embodiment of the present invention as thus described, it is therefore not necessary to provide on the multiple function PC card 1 separate dedicated connectors for each of the provided functions, and a single device connector 8 can be used for plural external devices.

It is also possible using a simple structure and circuit configuration to automatically and exclusively select one of the functions of the multiple function PC card 1 by simply connecting to the device connector 8 the connector of the cable used to connect the external device used for a particular function. It is therefore possible to reduce the cost of a multiple function PC card providing plural functions of which none are used simultaneously, and to thereby improve the portability of devices in which such multiple function PC cards are used.

When the multiple function PC card 1 provides only two functions that are not used simultaneously, a binary signal having only HIGH and LOW signal states can be used as the identification signal. By using the power supply voltage supplied to the multiple function PC card 1 as the HIGH signal level, and the ground potential of the multiple function PC card 1 as the LOW signal level, it is not necessary to provide a separate circuit to generate the identification signal, and the card cost can therefore be reduced.

It is to be noted that while the multiple function PC card of the first embodiment of the invention has been described above as a multiple function PC card providing the functions of a modem card and a communications card, the multiple function PC card of the present invention shall not be so limited and other combinations of functions that are not used simultaneously may be used.

It is also possible to provide three or more functions insofar as they will fit within a single PC card. In this case, however, the number of connector pins used to discriminate the connector connected to the device connector 8 will increase, and which connector is connected to the device connector 8 can be identified by supplying signal types or signal levels corresponding to the functions of the PC card.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A multiple function PC card that is an input/output card providing a plurality of functions not used simultaneously comprising:

PC connection means for connecting the multiple function PC card to a computer, a single device connection means including a first connector, connectable to different types of, said first connector being built in the multiple function PC card and configured to connect the plurality of different types of second connectors, each of a plurality of external devices having only one of the plurality of different types of second connectors to permit connection to the multiple function PC card for accessing one of the plurality of functions, a plurality of execution means for executing each of the plurality of functions, respectively, and discrimination means for identifying one of the plurality of external devices based on the only one of the plurality of different types of second connectors connected to the multiple function PC card through said device connection means, thereby identifying a function corresponding to the plural kinds of external devices connected among the plurality of functions, wherein said discrimination means designates one of said plurality of execution means in response to the function identified and the one of the plurality of execution means, when designated, operates exclusively of the remaining plurality of execution means.

2. The multiple function PC card of claim 1, wherein the second connector has a connector pin arrangement corresponding to each kind of external device and said first connector has a connector pin arrangement capable of matching all connector pin arrangements of the second connector.

3. The multiple function PC card of claim 2, wherein said discrimination means discriminates the function based on the connector pin arrangement of the second connector connected to said first connector.

4. The multiple function PC card of claim 3, wherein said discrimination means includes signal generation means for outputting discrimination signals for discriminating the connector pin arrangement of said second connector and signal detection means for detecting signals from the second connector in accordance with the connector pin arrangement of the second connector to identify the function to be accessed by the external device.

5. The multiple function PC card of claim 4, wherein said first connector has connector pins for outputting the discrimination signals and connector pins for inputting signals from the second connector.

6. A multiple function PC card that is an input/output card providing a plurality of functions not used simultaneously comprising:

connection means for connecting the multiple function PC card to a host machine, device connection means including a first connector, said first connector being built in the multiple function PC card and configured to connect to a plurality of different types of second connectors, each of the plurality of different types of second connectors corresponding to only one of the plural kinds of external devices to permit connection to the multiple function PC card for accessing one of the plurality of functions, said device connection means further including automatic identification means for automatically identifying a type of the plural kinds of external devices connected to the host machine based on its unique second connector, a plurality of execution means for executing each of the plurality of functions, respectively, and discrimination means for identifying a function corresponding to the type of the plural kinds of external devices identified by said automatic identification means among the plurality of functions, wherein said discrimination means designates one of said plurality of execution means in response to the function identified and the one of the plurality of execution means, when designated, operates exclusively of the remaining plurality of execution means.

7. A multiple function PC card that is an input/output card providing a plurality of functions comprising:

PC connection means for connecting said multiple function PC card to a computer;

single device connection means capable of connecting an arbitrary one of plural kinds of external devices each provided with a specific connector adaptable to said single device connection means;

a plurality of execution means each for executing one of the plurality of functions corresponding one to one to the plural kinds of external devices;

discrimination means for identifying the kind of an external device when it is connected to said PC card by its specific connector; and enabling means for enabling only one execution means corresponding to the kind of external device identified by said discrimination means.

\* \* \* \* \*